United States Patent [19]

Gangal

[11] 4,189,551
[45] Feb. 19, 1980

[54] PROCESS FOR REDUCING ADHESIONS DURING SUSPENSION POLYMERIZATION

[75] Inventor: Subhash V. Gangal, Parkersburg, W. Va.

[73] Assignee: E. I. Du Pont de Nemours and Company, Wilmington, Del.

[21] Appl. No.: 916,918

[22] Filed: Jun. 19, 1978

[51] Int. Cl.$^2$ .............................................. C08F 14/26
[52] U.S. Cl. .................................... 526/74; 526/206; 526/213; 526/255
[58] Field of Search ........................... 526/74, 213, 255

[56] References Cited

U.S. PATENT DOCUMENTS

| | | | |
|---|---|---|---|
| 2,398,926 | 4/1946 | Dorough | 526/255 |
| 2,613,203 | 10/1952 | Myers | 526/255 |
| 2,980,653 | 4/1961 | Johnson | 526/213 |
| 3,032,543 | 5/1962 | Bro et al. | 526/255 |
| 3,331,822 | 7/1967 | Kometani et al. | 526/255 |
| 3,515,709 | 6/1970 | Nelson et al. | 526/74 |
| 3,535,301 | 10/1970 | Groppelli et al. | 526/74 |
| 3,704,285 | 11/1972 | Porter | 526/255 |
| 4,016,345 | 4/1977 | Holmes | 526/206 |

FOREIGN PATENT DOCUMENTS 1397931 7/1972 United Kingdom .

OTHER PUBLICATIONS

Pennwalt Lucidol Product Bulletin, Org. Peroxide Bulletin 3.101 (Jul. 1971).

Primary Examiner—Harry Wong, Jr.

[57] ABSTRACT

Presence of a selected carboxylic acid in the aqueous polymerization mixture during suspension polymerization of tetrafluoroethylene has been found to reduce the amount of adhesions formed during the polymerization.

4 Claims, No Drawings

PROCESS FOR REDUCING ADHESIONS DURING SUSPENSION POLYMERIZATION

FIELD OF THE INVENTION

This invention relates to an improvement in the suspension polymerization of tetrafluoroethylene.

BACKGROUND OF THE INVENTION

The homopolymerization of tetrafluoroethylene and the copolymerization of tetrafluoroethylene and ethylenically unsaturated comonomers in aqueous medium can be carried out by two distinctly different procedures. In one procedure, called suspension polymerization, little or no dispersing agent is employed and agitation is carried out vigorously in order to produce a precipitated resin, commonly referred to as "granular" resin. In the other procedure, sufficient dispersing agent is employed and agitation is mild in order to produce small colloidal size particles dispersed in the aqueous reaction medium. In this second procedure, called aqueous dispersion polymerization, precipitation (i.e., coagulation) of the resin particles is avoided. The two procedures produce distinctly different products. The granular product can be molded in various forms, whereas the resin produced by the aqueous dispersion method cannot be molded but is fabricated by dispersion coating or by converting to powder for paste extrusion with a lubricating medium. In contrast, the granular resin is incapable of being paste extruded or dispersion coated.

A disadvantage which sometimes occurs during aqueous suspension polymerization is the formation of adhesions, i.e., unwieldy large clumps of resin particles, which form in the polymerization equipment, especially along the walls of the reactor, and may clog the equipment as well as reduce the yield of polymer produced. This formation is particularly evident when ionic polymerization initiators are employed. Methods developed in the art to reduce the amount of adhesions formed have heretofore been directed to making the walls of the reaction vessel slick or smooth to make it difficult for the adhesions to build up.

SUMMARY OF THE INVENTION

In this invention, formation of adhesions during suspension polymerization of tetrafluoroethylene in an aqueous medium to obtain a granular tetrafluoroethylene resin is reduced by carrying out the polymerization in the presence of an aliphatic, substantially non-telogenic carboxylic acid having a $-\log K$ of between about 1.5 and 10.0.

DESCRIPTION OF THE INVENTION

The polymerization of tetrafluoroethylene, alone or with other polymerizable ethylenically unsaturated comonomers, in aqueous medium to produce granular tetrafluoroethylene polymer is well known in the art. Tetrafluoroethylene monomer, along with ethylenically unsaturated comonomer if desired, is typically admixed or contacted with an aqueous medium containing a polymerization initiator. Ordinarily, the monomer (or monomers) is introduced into the medium under pressure. Typical conditions include polymerization temperatures of 50°–100° C.; preferably 60°–90° C.; and pressures of $10-50\times10^5$ Pa. The polymerization is ordinarily carried out in a vigorously stirred autoclave.

Initiators employed herein are ionic initiators. Examples of ionic polymerization initiators include inorganic persulfates such as ammonium persulfate or alkali metal persulfates such as potassium persulfate and the like. The initiator is added prior to initiation of polymerization. The amount of initiator employed depends on the temperature of polymerization, the nature of the initiator, the molecular weight of the polymer desired, and the rate of reaction desired. Thus, the amount will vary depending on the results desired by one skilled in the art. Ordinarily, the amount will be between 2 and 500 ppm, based on weight of water present.

A dispersing agent can be employed, if desired, which is an anionic, substantially non-telogenic dispersing agent. Preferably the dispersing agents are fluorinated carboxylates containing 7–20 carbon atoms, such as ammonium polyfluorocarboxylates. The amount of dispersing agent present, when used, is ordinarily between about 5 ppm and about 500 ppm based on weight of water employed in the aqueous dispersion and is insufficient to cause formation of colloidal polymer particles. The dispersing agent is usually added prior to initiation of polymerization. If desired, a small amount of a nonionic dispersing agent may be employed along with the anionic one.

Tetrafluoroethylene is either employed alone (to produce the homopolymer, polytetrafluoroethylene) or is employed with at least one other copolymerizable, ethylenically unsaturated organic comonomer. The amount of comonomer employed will depend upon the properties desired in the polymer particles obtained. Ordinarily the amount of comonomer employed in the process of this invention will not be so great as to result in tetrafluoroethylene copolymers having more than 35% by weight of comonomer units. (If more than 35% is used, the copolymer tends to lose its nonelastomeric nature.) As is known in the art, as the comonomer content increases, the tetrafluoroethylene copolymers tend to become melt-processible. The polymers useful herein include both melt-processible and non-melt-processible polymers. The amount of comonomer that causes the copolymer to become melt-processible depends upon its molecular weight and thus varies from comonomer to comonomer. Especially preferred comonomers, whether the resulting copolymer is melt-processible or non-melt-processible, are perfluoro (terminally unsaturated olefins) of 3–7 carbon atoms such as hexafluoropropylene, and perfluoro (alkyl vinyl ethers) of 3–7 carbon atoms such as perfluoro (n-propyl vinyl ether).

Polymerization is ordinarily conducted until the solids level (i.e., polymer content) of the aqueous mixture is between about 15 and 40 percent by weight of the mixture.

The aliphatic, substantially non-telogenic, carboxylic acid contains 1–6 carbon atoms and is one having a $-\log K$ of between about 1.5 and 10, and preferably between 2 and 5. The term K represents the dissociation constant of the acids. When two or more carboxyl groups are present, K is the first dissociation constant. The acid may contain more than 1, e.g., 2 or 3, carboxyl groups and may contain several, e.g., 1 or 2 or 3, non-telogenic substituents, such as amino or fluorine. Preferably the aliphatic group is an alkyl or alkylene group. Most preferably the acid is an alkylene dicarboxylic acid, containing between 3 and 6 carbon atoms. Representative acids include malonic, succinic, adipic, citric, acetic, or formic acids. It is pointed out that generally any hydrogen bonded to a carbon atom that is not a carbon atom alpha to a carboxyl group imparts telogenic activity to the acid.

The acid employed should preferably be present in an amount between about 25 and about 2500 ppm based on water, and preferably between about 100 and 500 ppm. The acid is usually added prior to initiation of polymerization but can be added intermittently or continuously during the polymerization. The amount employed will depend on the acid, temperature and pressure of reaction, and purity of reactants.

By the term "substantially non-telogenic" used in the definition of the acid and dispersing agent is meant that the polymer produced has a standard specific gravity (SSG) substantially (within the realm of experimental error) the same as a polymer produced without the acid and dispersing agent present. SSG is a measure of the molecular weight of the polymer can be determined by the procedure in U.S. Pat. No. 4,016,345, Column 7.

The resin produced herein is of the same quality and is useful in the same manner as granular tetrafluoroethylene polymers known heretofore. For example, the polymers are useful in making molded articles.

The Examples hereinbelow describe the invention in greater detail. Because suspension polymerizations of tetrafluoroethylene are difficult to reproduce exactly due to sensitivity to monomer purity or polymerizer cleanliness, polymerization runs carried out on different days are not generally comparable. In the following Examples, the designated comparisons were carried out on the same day as the Example compared with.

EXAMPLE 1

A type 316 stainless steel pressure polymerizer equipped with a steam/water jacket for heating and cooling was used. The polymerizer, located in a barricade, had a length/diameter ratio of 1.77 and was vigorously agitated during the run at 600 rpm using an agitator with two 45°-pitched blades.

After removing air from the vessel by flushing with nitrogen, 19.1 kg demineralized water was added along with 0.3 g ammonium persulfate (15.7 ppm) initiator, 1.8 g ammonium perfluorooctanoate ionic dispersing agent and 10 ml of a 0.226 g/l aqueous solution of nonionic Triton X-100 dispersing agent. 5.0 g (262 ppm) succinic acid were also added. The vapor space was evacuated at 65° C. and tetrafluoroethylene (TFE) was added to give a pressure of 1.722 MPa. The temperature was kept constant while polymerization progressed with stirring for 120 minutes, after which agitation was stopped. During this time, a total of 11.36 kg TFE was fed.

Water-wet polymer (12.25 kg) was discharged. In the apparatus, 1.18 kg adhesions were found.

COMPARISON TO EXAMPLE 1

On the same day, an identical experiment was performed except the succinic acid was omitted and the pressure was allowed to react down to 0.138 MPa. A total of 11.36 kg TFE was fed during 114 minutes.

Water-wet polymer (9.1 kg) was discharged. On disassembly of the apparatus, a solid doughnut of adhered polymer weighing 4.54 kg was found along with 0.227 g of other adhesions. Thus, the unusable polymer in this comparison was 4.77/1.18 or about four times as much as in Example 1 which employed succinic acid.

EXAMPLE 2

Example 2, parts A, B, C, D and E and the comparison control were carried out employing the apparatus and process conditions as in Example 1 except 2.5 g (131 ppm) of a carboxylic acid was used in the aqueous polymerization medium, and reaction times varied, all shown in Table I. Results are also shown in Table I.

TABLE I

| Examples and Comparison | Reaction Time (min.) | Acid Additive | −logK of acid | ppm acid | Kg Adhesions found |
|---|---|---|---|---|---|
| Comparison Control | 120 | — | — | — | 0.91 |
| 2A | 76 | malonic | 2.85 | 131 | 0.45 |
| 2B | 107 | citric | 3.06 | 131 | 0.09 |
| 2C | 153 | succinic | 4.19 | 131 | 0.36 |
| 2D | 104 | acetic | 4.76 | 131 | 0.45 |
| 2E | 107 | citric | 3.06 | 131 | 0.09 |

I claim:

1. In the suspension polymerization of tetrafluoroethylene in an aqueous medium to obtain precipitated polytetrafluoroethylene in the presence of an ionic initiator, which comprises carrying out said polymerization at a temperature of between about 50° C. and 100° C. and at a pressure of between about $10 \times 10^5$ and $50 \times 10^5$ Pa, the improvement which comprises reducing formation of adhesions by employing in the aqueous medium an aliphatic, substantially non-telogenic carboxylic acid selected from the class consisting of malonic acid, succinic acid, adipic acid, citric acid, acetic acid and formic acid, said acid being present in an amount between 25 and 2500 ppm, based on weight of water present.

2. Process of claim 1 wherein the carboxylic acid is citric or succinic acid.

3. In the suspension polymerization of tetrafluoroethylene in an aqueous medium to obtain precipitated polymeric tetrafluoroethylene in the presence of an ionic initiator, which comprises polymerizing tetrafluoroethylene and at least one other copolymerizable, ethylenically unsaturated comonomer present in an amount sufficient to provide up to 35% by weight of the copolymer at a temperature of between about 50° C. and 100° C. and at a pressure of between about $10 \times 10^5$ and $50 \times 10^5$ Pa, the improvement which comprises reducing formation of adhesions by employing in the aqueous medium an aliphatic, substantially non-telogenic carboxylic acid selected from the class consisting of malonic acid, succinic acid, adipic acid, citric acid, acetic acid and formic acid, said acid being present in an amount between 25 and 2500 ppm, based on weight of water present.

4. Process of claim 3 wherein the carboxylic acid is citric or succinic acid.

* * * * *

REEXAMINATION CERTIFICATE (1685th)

United States Patent [19]
Gangal

[11] B1 4,189,551

[45] Certificate Issued Apr. 28, 1992

[54] PROCESS FOR REDUCING ADHESIONS DURING SUSPENSION POLYMERIZATION

[75] Inventor: Subhash V. Gangal, Parkersburg, W. Va.

[73] Assignee: E. I. Du Pont de Nemours & Co.

Reexamination Request:
No. 90/001,990, Mar. 29, 1990

Reexamination Certificate for:
Patent No.: 4,189,551
Issued: Feb. 19, 1980
Appl. No.: 916,918
Filed: Jun. 19, 1978

[51] Int. Cl.$^5$ .......... C08F 2/00; C08F 14/18; C08F 114/18; C08F 2124/18
[52] U.S. Cl. .......... 526/74; 526/206; 526/213; 526/255
[58] Field of Search .......... 526/74

[56] References Cited

U.S. PATENT DOCUMENTS 2,393,967  2/1946  Brubaker .......... 260/80

*Primary Examiner*—Paul R. Michl

[57] ABSTRACT

Presence of a selected carboxylic acid in the aqueous polymerization mixture during separation polymerization of tetrafluoroethylene has been found to reduce the amount of adhesions formed during the polymerization.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4, dependent on an amended claim, are determined to be patentable.

1. In the suspension polymerization of tetrafluoroethylene in an aqueous medium *in a polymerizer equipped with a rotating internal agitator providing vigorous agitation during the suspension polymerization* to obtain precipitated polytetrafluoroethylene in the presence of *2 to 500 ppm, based on weight of water present, of* an ionic initiator, which comprises carrying out said polymerization at a temperature of between about 50° C. and 100° C. and at a pressure of between about $10 \times 10^5$ and $50 \times 10^5$ Pa, the improvement which comprises reducing formation of adhesions by employing in the aqueous medium an aliphatic, substantially non-telogenic carboxylic acid selected from the class consisting of malonic acid, succinic acid, adipic acid, citric acid, acetic acid and formic acid, said acid being present in an amount between 25 and 2500 ppm, based on weight of water present.

3. In the suspension polymerization of tetrafluoroethylene in an aqueous medium *in a polymerizer equipped with a rotating internal agitator providing vigorous agitation during the suspension polymerization* to obtain precipitated polymeric tetrafluoroethylene in the presence of *2 to 500 ppm, based on weight of water present, of* an ionic initiator, which comprises polymerizing tetrafluoroethylene and at least one other copolymerizable, ethylenically unsaturated comonomer present in an amount sufficient to provide up to 35% by weight of the copolymer at a temperature of between about 50° C. and 100° C. and at a pressure of between about $10 \times 10^5$ and $50 \times 10^5$ Pa, the improvement which comprises reducing formation of adhesions by employing in the aqueous medium an aliphatic, substantially non-telogenic carboxylic acid selected from the class consisting of malonic acid, succinic acid, adipic acid, citric acid, acetic acid and formic acid, said acid being present in an amount between 25 and 2500 ppm, based on weight of water present.

* * * * *